United States Patent
Uehori

(10) Patent No.: US 8,358,875 B2
(45) Date of Patent: Jan. 22, 2013

(54) IMAGE DISPLAY DEVICE, IMAGE DISPLAY METHOD, AND COMPUTER READABLE MEDIUM

(75) Inventor: Yukiyo Uehori, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 762 days.

(21) Appl. No.: 12/467,342

(22) Filed: May 18, 2009

(65) Prior Publication Data

US 2010/0111419 A1    May 6, 2010

(30) Foreign Application Priority Data

Oct. 31, 2008  (JP) ................. 2008-281981

(51) Int. Cl.
*G06K 9/32* (2006.01)
(52) U.S. Cl. ....... 382/298; 345/443; 348/135; 358/3.06; 358/462; 382/176; 715/210
(58) Field of Classification Search .................. None
See application file for complete search history.

(56) References Cited

U.S. PATENT DOCUMENTS

| | | | | |
|---|---|---|---|---|
| 4,980,840 A | * | 12/1990 | Yin et al. ...................... | 715/210 |
| 5,526,474 A | * | 6/1996 | Fukushima .................... | 345/443 |
| 5,687,006 A | * | 11/1997 | Namizuka et al. ............ | 358/462 |
| 8,059,895 B2 | * | 11/2011 | Tamaru ......................... | 382/176 |
| 2002/0085233 A1 | * | 7/2002 | Degani et al. ................ | 358/3.06 |
| 2007/0150829 A1 | | 6/2007 | Eschbach et al. | |
| 2009/0097750 A1 | * | 4/2009 | Tamaru ......................... | 382/176 |
| 2010/0141758 A1 | * | 6/2010 | Kim et al. ..................... | 348/135 |

FOREIGN PATENT DOCUMENTS

| | | | |
|---|---|---|---|
| EP | 2073192 A1 | * | 6/2009 |
| JP | 2000-259142 A | | 9/2000 |
| JP | 2001-202362 A | | 7/2001 |
| JP | 2007079947 A | * | 3/2007 |
| JP | 2008-52496 A | | 3/2008 |
| JP | 2008-170742 A | | 7/2008 |

OTHER PUBLICATIONS

Japanese Office Action issued on Sep. 14, 2010 in the corresponding Japanese Patent Application No. 2008-281981.

* cited by examiner

*Primary Examiner* — Tsung-Yin Tsai
(74) *Attorney, Agent, or Firm* — Sughrue Mion, PLLC

(57) ABSTRACT

An image display device includes: an acceptance unit that accepts image information including at least one character image as a processing object; a detection unit that detects a size of a character included in the accepted image information; an extraction unit that extracts at least one part of the image information as a display object image; a decision unit that decides an enlargement ratio or a reduction ratio based on a size of the character included in the extracted display object image, information on the size of the character detected by the detection unit, and information on a size range for the character; and a display unit that displays the extracted display object image enlarged or reduced at the enlargement ratio or the reduction ratio decided by the decision unit.

10 Claims, 7 Drawing Sheets

COMPARATIVE EXAMPLE

EXAMPLE

IMAGE DISPLAY DEVICE, IMAGE DISPLAY METHOD, AND COMPUTER READABLE MEDIUM

CROSS-REFERENCE TO RELATED APPLICATIONS

This application is based on and claims priority under 35 U.S.C. 119 from Japanese Patent Application No. 2008-281981 filed Oct. 31, 2008.

BACKGROUND

1. Technical Field

The present invention relates to an image display device, an image display method, and a computer readable medium.

2. Summary

According to an aspect of the present invention, an image display device includes: an acceptance unit that accepts image information including at least one character image as a processing object; a detection unit that detects a size of a character included in the accepted image information; an extraction unit that extracts at least one part of the image information as a display object image; a decision unit that decides an enlargement ratio or a reduction ratio based on a size of the character included in the extracted display object image, information on the size of the character detected by the detection unit, and information on a size range for the character; and a display unit that displays the extracted display object image enlarged or reduced at the enlargement ratio or the reduction ratio decided by the decision unit.

BRIEF DESCRIPTION OF THE DRAWINGS

Exemplary embodiment of the present invention will be described in detail based on the following figures, wherein.

DETAILED DESCRIPTION

Figure 1:
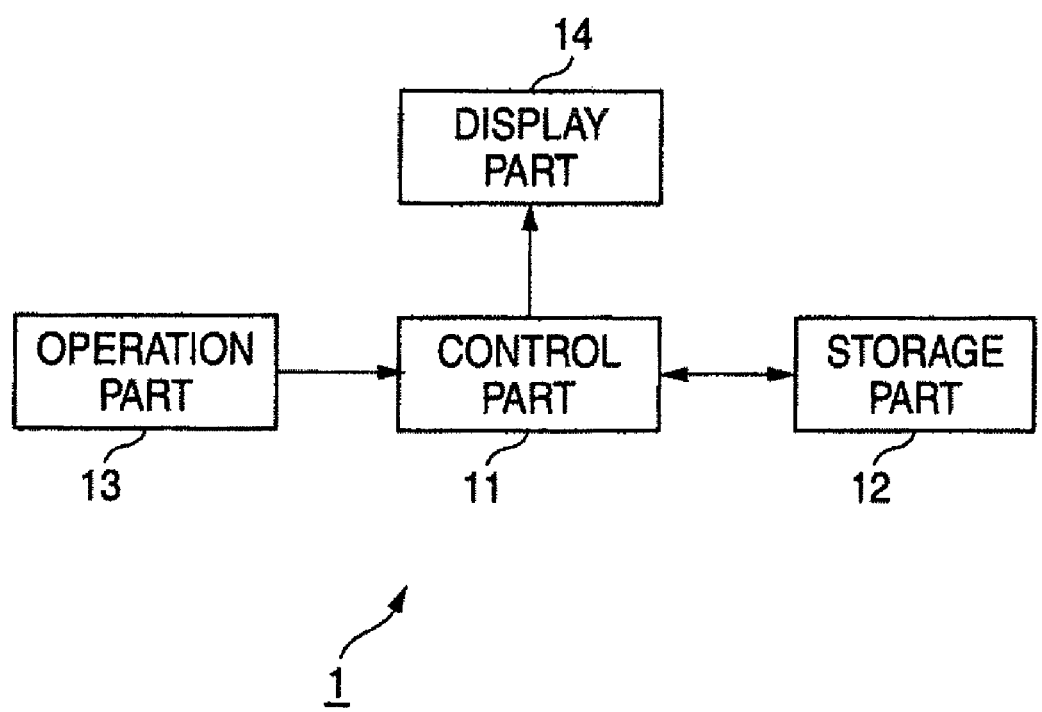
FIG. 1 is a block diagram showing a configuration example of an image display device according to an embodiment of the present invention.

The embodiments of the present invention will be described below with reference to the drawings. An image display device 1 according to an embodiment of the invention comprises a control part 11, a storage part 12, an operation part 13, and a display part 14, as shown in FIG. 1.

The control part 11 is a program control device such as a CPU (Central Processing Unit), and operates in accordance with a program stored in the storage part 12. This control part 11 accepts the image information of a bit map including at least one character image as a processing object, and detects the size of character (character size) included in all the accepted image information. Also, this control part 11 extracts at least one part of the image information of display object, decides the enlargement or reduction ratio, based on information of the size of character (character size) included in the extracted part, the character size included in all the image information and information on a predetermined range of the size of character, and displays at least one part of the image information enlarged or reduced at the decided enlargement or reduction ratio. The detailed processing contents of this control part 11 will be described later.

The storage part 12 comprises a memory device such as a RAM (Random Access Memory). Also, this storage part 12 may comprise a non-volatile memory device or a disk device. A program executed by the control part 11 is held in this storage part 12. This program may be provided by being stored in a computer readable recording medium such as a DVD-ROM (Digital Versatile Disc-Read Only Memory) and copied to this storage part 12. Further, this storage part 12 operates as a work memory of the control part 11.

The operation part 13 is a keyboard, a ten key or a mouse, which accepts the input of an instruction from the user, and outputs the instruction to the control part 11. The display part 14 may be a liquid crystal display that displays information in accordance with the instruction inputted from the control part 11.

Also, the image display device 1 of this embodiment may comprise communication means such as a network card and means for reading information from a portable memory device such as a semiconductor memory, and accept the image information of display object from them.

The control part 11 of this embodiment performs a layout analysis process for the image information of processing object to demarcate at least one character area. For example, the control part 11 binarizes the image information of processing object, and detects a lump of consecutive black pixels (lump of meaningful pixels, hereinafter referred to as a pixel lump). And the information on a circumscribed rectangle circumscribing each pixel lump is generated.

Figure 2:
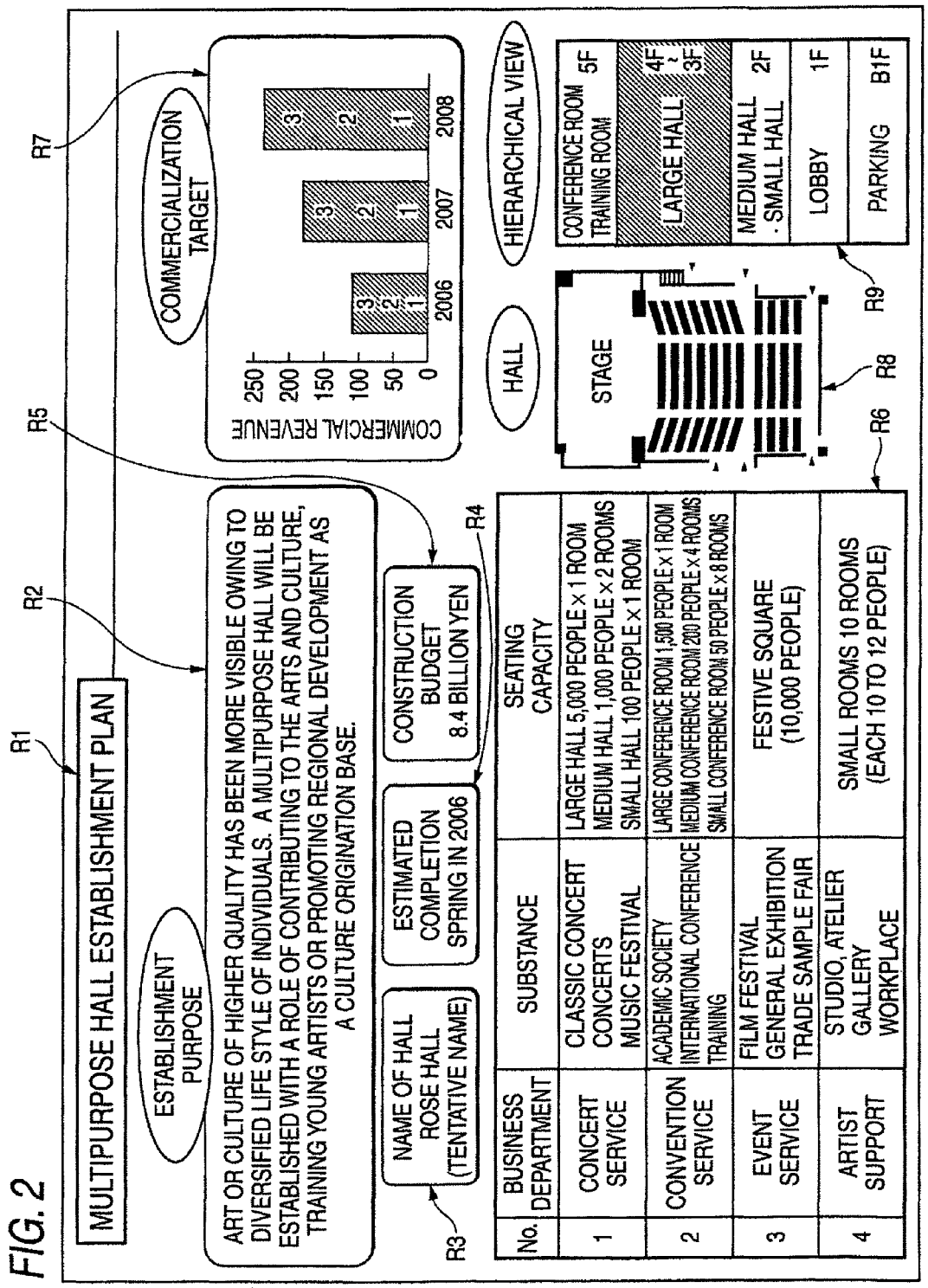
FIG. 2 is an explanatory view showing an example of image information of processing object by the image display device according to the embodiment of the invention.

In this embodiment, the image information of processing object includes at least one image element including the character string, as typically shown in FIG. 2. Herein, the image element is a unit of image, for example, a group of circumscribed rectangles circumscribing the meaningful pixels under the predetermined conditions, or a group of images rendered by one set of rendering commands in the case where the image is rendered by a rendering command, as described in the following.

Figure 3:
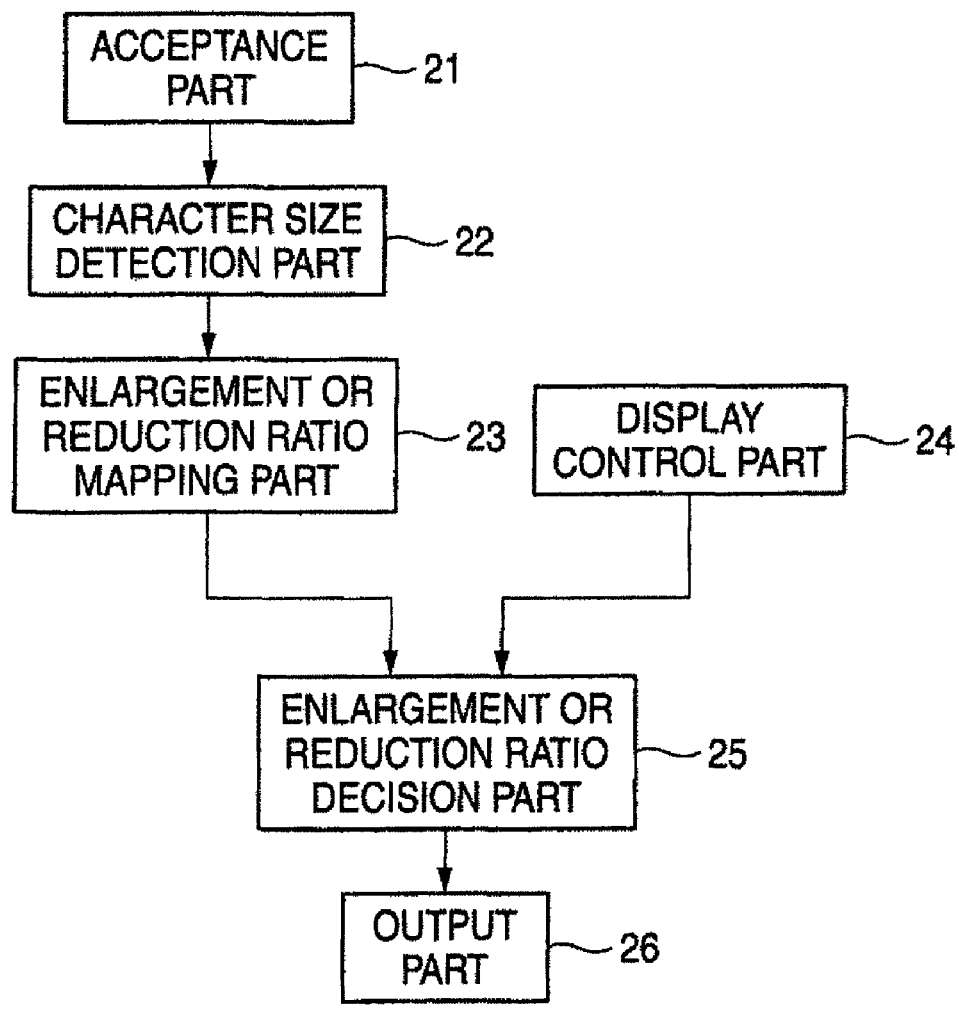
FIG. 3 is a functional block diagram showing an example of the image display device according to the embodiment of the invention.

The specific contents of a process of the control part 11 will be described below. The control part 11 functionally comprises an acceptance part 21, a character size detection part 22, an enlargement or reduction ratio mapping part 23, a display control part 24, an enlargement or reduction ratio decision part 25, and an output part 26, as illustrated in FIG. 3.

The acceptance part 21 accepts the image information of the bit map and holds it as the processing object in the storage part 12. The character size detection part 22 performs the layout analysis process for the image information of processing object held in the storage part 12 to detect a circumscribed rectangle circumscribing a meaningful pixel lump. This character size detection part 22 stores each information on the detected circumscribed rectangle (coordinate information specifying the circumscribed rectangle) associated with the intrinsic identification information (circumscribed rectangular identifier) in the storage part 12.

Further, the character size detection part 22 associates one pair of circumscribed rectangles in nearer distance than a predetermined distance with a common group identifier by referring to information of each detected circumscribed rectangle. Also, if there is another circumscribed rectangle contained in any circumscribed rectangle, another circumscribed rectangle and the circumscribed rectangle containing it are associated with the common group identifier. And after the above grouping process is repeated until there is no more circumscribed rectangle to be grouped, a circumscribed rectangle (image element circumscribed rectangle) further circumscribing a group of circumscribed rectangles associated with the common group identifier is demarcated for each of mutually different group identifiers. And the coordinate information specifying the demarcated image element circumscribed rectangle and the image element identifier intrinsic to each image element circumscribed rectangle are associated, and stored as an image element database in the storage part 12. Thus, a portion surrounded by the border line is identified as one image element, and a portion where the character string is arranged is identified as one image element in the character area. Such process may be the process widely known as the layout analysis process.

Also, the character size detection part 22 detects the character size based on the size of the character rectangle with the circumscribed rectangle according with the predetermined conditions among the detected circumscribed rectangles as the rectangle (character rectangle) circumscribing the character image. As one example, this character size detection part 22 judges, as the pixels representing the character, the pixel lump within the circumscribed rectangle satisfying the conditions that the area is smaller than a predetermined area threshold value and the density of black pixel (meaningful pixel) within the circumscribed rectangle (the number of meaningful pixels divided by the total number of pixels within the circumscribed rectangle) is smaller than a predetermined density threshold value, among the circumscribed rectangles detected through the layout analysis process, and detects the size of the circumscribed rectangle (a larger value of the vertical and horizontal numbers of pixels) as the character size. The character size detection part 22 accumulates a list of detected character sizes as a character size database in the storage part 12. In this way, there are various other methods of finding the circumscribed rectangle including the character, but any method may be employed.

The enlargement or reduction ratio mapping part 23 acquires information on the size of character included in all the image information of processing object by referring to the character size database and finds the maximum value of character size (maximum value Xmax) and the minimum value of character size (minimum value Xmin). And the enlargement or reduction ratio mapping part 23 calculates the scale ratio $\beta=(Ymax-Ymin)/(Xmax-Xmin)$, using the upper limit target value Ymax and the lower limit target value Ymin in the predetermined range of character size.

The display control part 24 extracts at least one part of the image information as the display object upon an instruction of the user. The enlargement or reduction ratio decision part 25 detects the image element included in the extracted display object. That is, the circumscribed rectangle of image element at least partly overlapping in the range of coordinates of the display object is extracted as the image element database.

And the enlargement or reduction ratio decision part 25 decides the enlargement or reduction ratio based on the size of character rectangle included in the image element and the scale ratio $\beta$ for each image element surrounded by the circumscribed rectangle of image element extracted from the image element database. More specifically, one of the sizes of character rectangles included in the image element of notice (image element subjected to the arithmetic operation of the enlargement or reduction ratio) is selected as a representative size X and the enlargement or reduction ratio S is decided using the previously-mentioned lower limit value Ymin and the minimum value Xmin of character size included in all the image information in accordance with $$S=(Ymin+(X-Xmin)\times\beta)/X$$

Herein, the representative size X may be the size of character rectangle for the character scrutinized by the user among the sizes of character rectangles included in the image element of notice. In this case, the size of character rectangle for the first character in the order of reading the character string or the size of character rectangle including the point or area designated by the user is suitably used as the representative size X. Herein, the first character in the order of reading the character string is the most upper left character in the case of reading from left to right and starting the new line downward, or the most upper right character in the case of reading from top to bottom and starting the new line leftward, for example.

Also, the representative size X may be the size of the highest appearance frequency, or the average or intermediate value of the minimum value and the maximum value of the size of character rectangle included in the image element of notice, and obtained by the statistical arithmetic operation using the size of character rectangle included in the image element of notice (the character having the size corresponding to the value may not be actually included in the image element of notice).

The output part 26 makes an enlargement or reduction process at the enlargement or reduction ratio S decided by the enlargement or reduction ratio decision part 25 for each image element included in the display object extracted by the display control part 24, and displays the enlarged or reduced image on the display part 14. Herein, if a plurality of image elements are included in the display object extracted by the display control part 24, the output part 26 may pick up the maximum value Smax of the enlargement or reduction ratios decided for the plurality of image elements, and arrange and display each image element at the position in which the upper left corner coordinate of each image element is multiplied by Smax, for example. If the plurality of image elements are included in the extracted display object, the image element in which the area of the portion included in the display object is maximum may be selectively displayed. That is, in this case, the image element in which the area is not maximum may not be displayed under the control.

This embodiment as configured above operates in the following way. In the following, a case where the display part 14 has 240 pixels in width×300 pixels in height with the image information (1052 pixels in width×714 pixels in height) as the processing object will be described below by way of example, as shown in FIG. 2.

Figure 4:
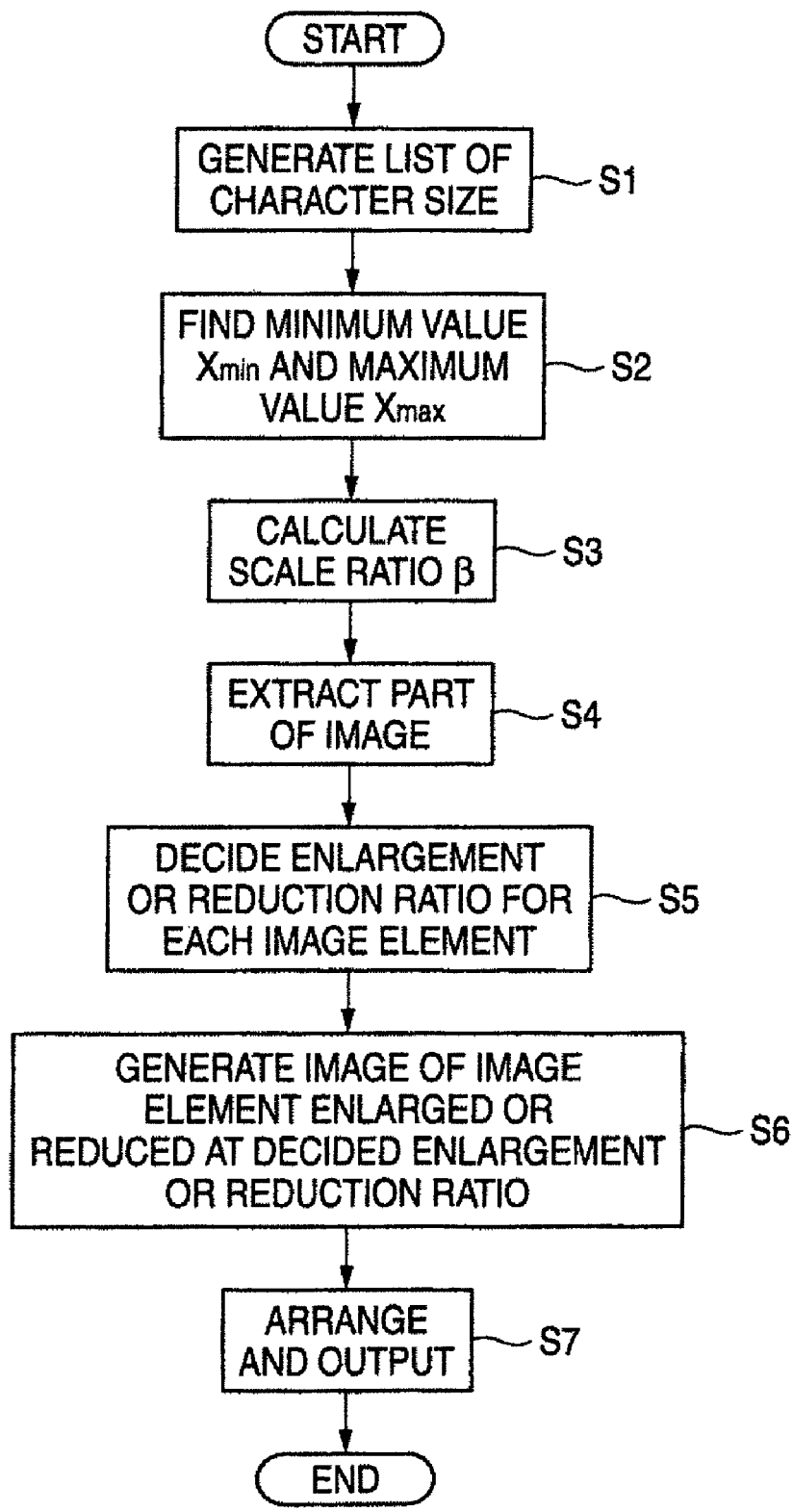
FIG. 4 is a flowchart showing an operation example of the image display device according to the embodiment of the invention.

In an example as shown in FIG. 2, a plurality of image elements such as a title part R1 (the character size contained is 77 pixels (px)), the sentence parts R2 to R5 surrounded by the border line (the character size contained is 31 pixels), and the chart parts R6 to R9 (the minimum character size contained is 22 pixels) where the chart is drawn are included. The image display device 1 of this embodiment, upon receiving an instruction of starting the display process, starts a process as shown in FIG. 4 to detect the size of character included in each part and generate a list of character size (character size database) (S1).

The image display device 1 finds the minimum value Xmin (22 pixels here) and the maximum value (77 pixels here) from this list of character size (S2). And the scale ratio β=(Ymax−Ymin)/(Xmax−Xmin), using the upper limit target value Ymax=26 pixels and the lower limit value Ymin=10 pixels in the predetermined range of character size (S3). Herein, β=16/55=0.29.

Then, a part of the image displayed on the display part 14 is extracted out of the image information. At first, an area of 240×300 pixels in the upper left corner part of the image information is extracted (S4). The title part R1 and the sentence part R2 are included herein. The image display device 1 calculates the enlargement or reduction ratios SR1 and SR2 for each individual image element (S5). And the enlarged or reduced image at the calculated enlargement or reduction ratio is generated for each image element (S6).

That is, for the image element of the title part R1, because the character of 77 pixels is only included, the representative size X=77, and the enlargement or reduction ratio SR1 of this image element is calculated as SR1=(10+(77−22)×0.29)/77. And the image display device 1 generates the image in which the image element of the title part R1 is reduced at SR1=26/77≈0.34.

Also, for the image element of the sentence part R2, the image display device 1 has the representative size X=31 pixels, because the character of 77 pixels and the character of 31 pixels are included but the mode of the character size for this image element is 31 pixels. The image display device 1 calculates the enlargement or reduction ratio SR2 of the sentence part R2 as SR2=(10+(31−22)×0.29)/31. And the image display device 1 generates the image in which the image element of the sentence part R2 is reduced at SR2=12.61/31≈0.41.

And the image display device 1 detects the maximum enlargement or reduction ratio SR2, multiplies the arrangement position (such as upper left corner coordinate) of each image element by the enlargement or reduction ratio SR2, arranges the title part R1 and the sentence part R2, and outputs them on the display part 14 (S7).

Figure 5A:
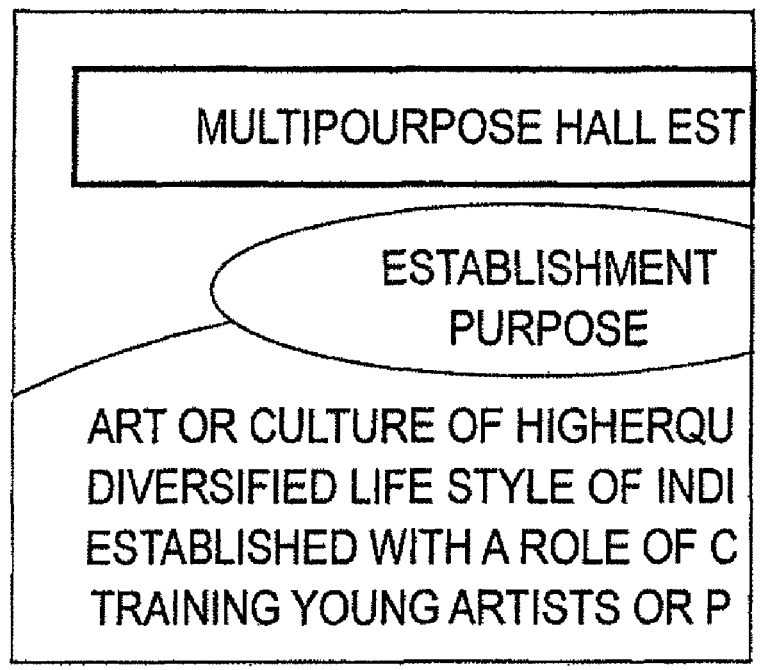
FIGS. 5A and 5B are explanatory views showing a display example of the image display device according to the embodiment of the invention.
Figure 5B:
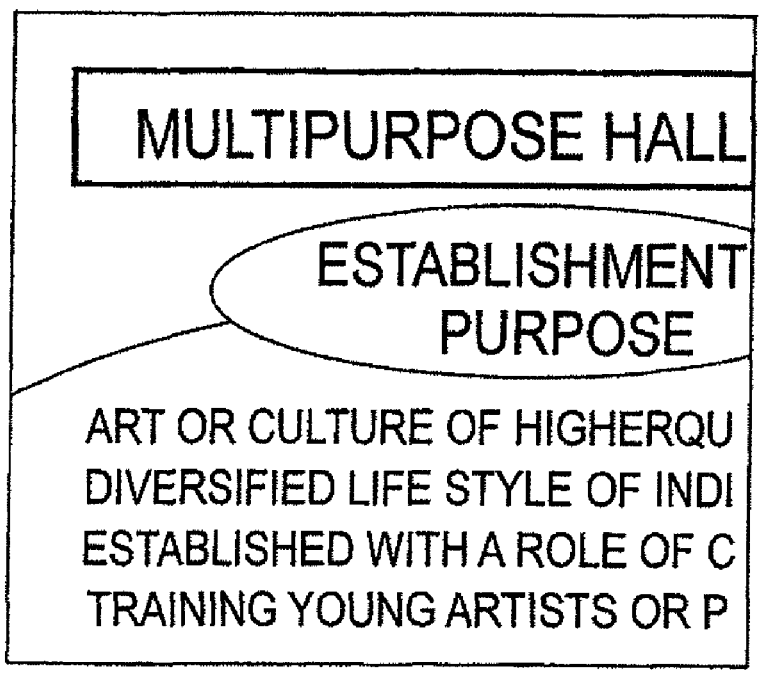

FIG. 5A shows a comparative example of enlargement or reduction in the prior art and FIG. 5B shows a display example on the image display device 1 of this embodiment. In the prior art, for each image element, the enlargement or reduction ratio is decided based on only the character size within the image element, whereby the character within any image element is displayed in the same size (e.g., 16 pixels).

On the contrary, in the display example of the image display device 1 according to this embodiment, because the enlargement or reduction ratio for each image element is decided in consideration of a distribution of the character size included in all the image information, the title part R1 is displayed in the character of 26 pixels and the sentence part R2 is displayed in reduction to 32 pixels ([77×0.41]) for the portion that was the character of 77 pixels and 13 pixels ([12.61]) for the portion that was the character of 31 pixels. Herein, "[*]" means the integer value nearest to the numerical value within the parentheses. However, this calculation may be made by rounding up or down the decimal fraction, or setting the nearest value in 0.5 pixel units, instead of obtaining the nearest integer value.

Since the image pixel is decided based on the distance between the circumscribed rectangles herein, the character rectangles of multiple character sizes are included in the sentence part R2. However, the image display device 1 of this embodiment can extract the image element for each character rectangle of character size common to each other by associating not only the distance between circumscribed rectangles but also the common group identifier if the ratio of the sizes of circumscribed rectangles is in a predetermined range from "1" to a threshold value in deciding the image element. For the image information as shown in FIG. 2, if the image element is extracted for each character rectangle of character size common to each other as in this example, the sentence part R2 is processed as the image elements mutually different in the title lettering part (character part of 77 pixels) and the text part (character part of 31 pixels), whereby the character of the title lettering part is displayed in 26 pixels and the character of the text part is displayed in 13 pixels. Further, though the enlargement or reduction ratio is decided for each image element in the foregoing explanation, the enlargement or reduction ratio may be decided for each character rectangle included in the image portion extracted as the display object.

(Another Example of Scale Ratio Calculation)

Figure 6:
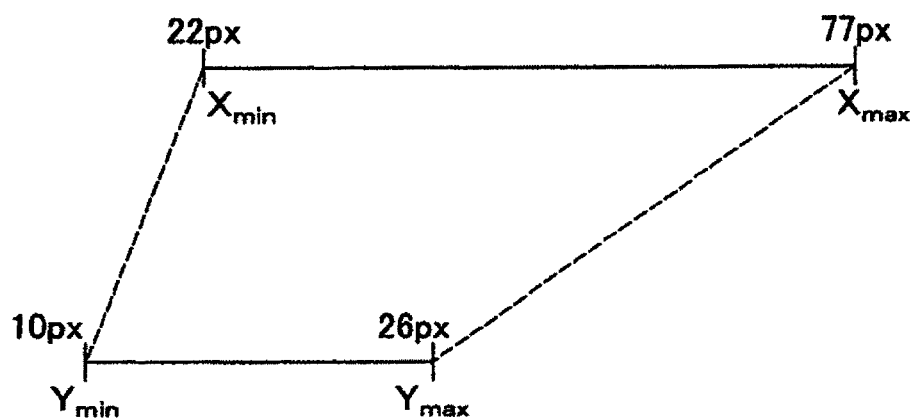
FIG. 6 is an explanatory view showing an example of the relationship between the character size in a predetermined interval and the enlargement or reduction ratio in the image display device according to the embodiment of the invention.
Figure 6:
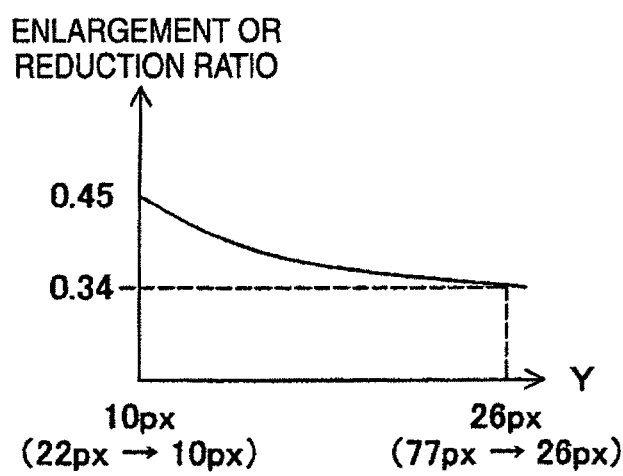
Figure 7:
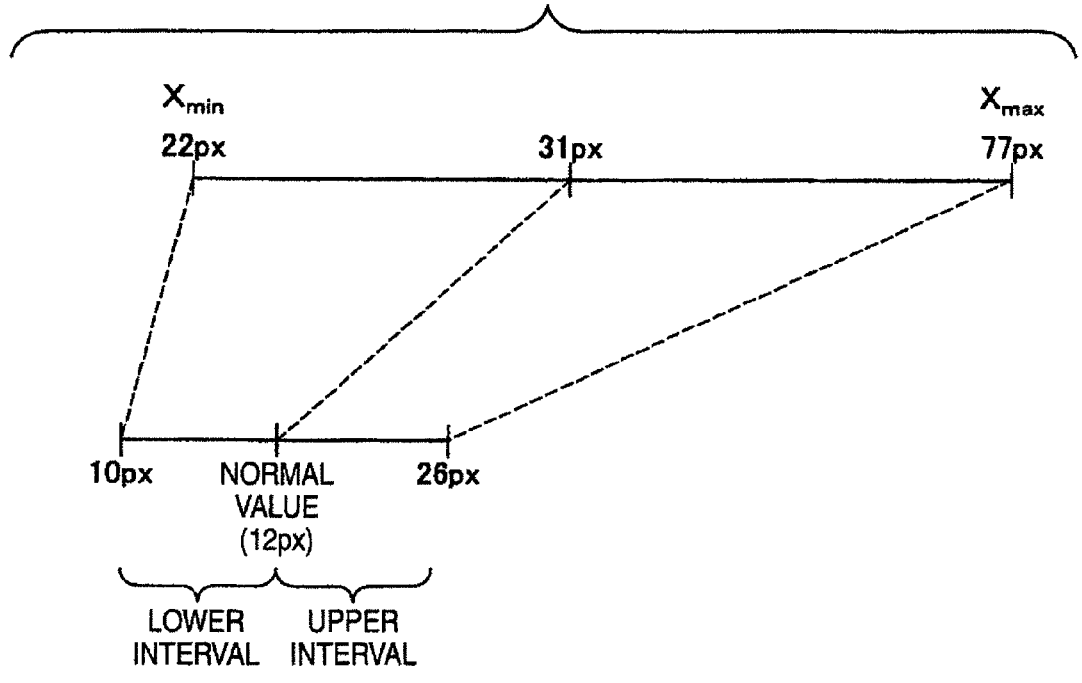
FIG. 7 is an explanatory view showing another example of the relationship between the character size in a predetermined interval and the enlargement or reduction ratio in the image display device according to the embodiment of the invention.
Figure 7:
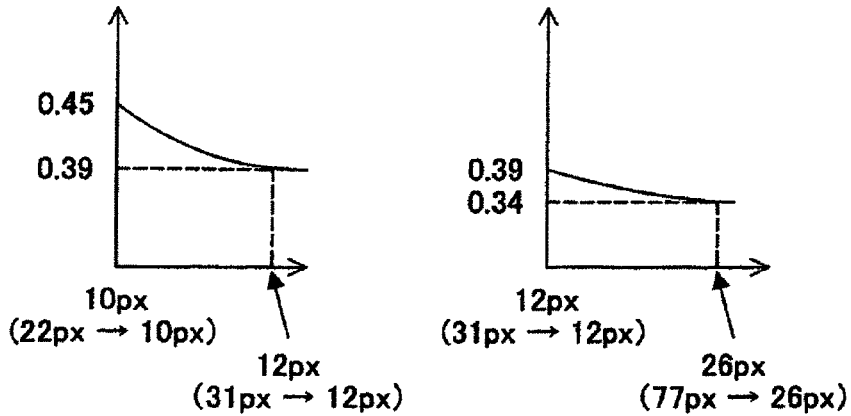

Though in the previous example, the scale ratio is decided so that the range (Xmin to Xmax) of character size may be matched with the predetermined range (Ymin to Ymax) according to the size of character included in all the image information, as shown in FIG. 6, the calculation of the scale ratio is not limited to this method.

For example, the control part 11 of the image display device 1 calculates the mode of the character size (character size of the highest appearance number among the character sizes included in the character size database) by referring to the list of character size (character size database) detected from the image information. And the scale ratio may be decided so that the calculated mode Xm may be equal to a predetermined normal value Ynormal included in the predetermined range (Ymin to Ymax).

As one example, the control part 11 adopts an intermediate value (Ynormal(Ymin+Ymax)/2) in the predetermined range as the normal value Ynormal. And the lower interval scale ratio βL is calculated so that the character sizes from the minimum value X to the mode Xm are distributed over the range from Ymin to Ynormal. That is, the control part 11 calculates $$\beta L = Y\text{min} + (X - X\text{min}) \times (Y\text{normal} - Y\text{min}) / (X m - X\text{min})$$

Also, the upper interval scale ratio βU is calculated so that the character sizes from the mode Xm to the maximum value Xmax are distributed over the range from Ynormal to Ymax. That is, the control part 11 calculates $$\beta U = Y\text{normal} + (X - Xm) \times (Y\text{max} - Y\text{normal}) / (X\text{max} - Xm)$$

(FIG. 7).

In this example, the control part 11 judges whether or not the representative size X found from the image elements of enlargement or reduction object (or the size X of character rectangle to be enlarged or reduced if the individual character rectangle is enlarged or reduced) is lower than the mode Xm, and decides the enlargement or reduction ratio S as S=βL/X if the representative size is lower than the mode Xm. Also, if the representative size is not lower than the mode Xm, the control part 11 decides the enlargement or reduction ratio S is $$S = \beta U / X$$

(Correction for Lower Limit Value)

Also, the control part 11, upon receiving an instruction of enlarged display from the user, corrects the predetermined value of Ymin to a larger value. For example, the new value of Ymin is obtained by adding a preset value of ΔY to the value of Ymin. And the scale ratio β (only βL in the lower interval if it is divided into the upper interval and the lower interval) is recalculated, and the enlargement or reduction ratio is recalculated, whereby the image element enlarged or reduced at the recalculated enlargement or reduction ratio is displayed.
(Change Instruction of Enlargement or Reduction Ratio)

Further, the control part 11, upon receiving an instruction of reduced display from the user, detects the size of character included in the image being displayed at present. For example, the control part 11 checks whether or not the representative size exceeds a predetermined value such as the intermediate value (Ymid=(Ymin+Ymax)/2) in the predetermined range by referring to the representative size of the image element being displayed (possibly the mode of character size included in the image element being displayed). Herein, if the representative size exceeds the predetermined value, the upper limit value Ymax is corrected to be smaller. Also, if the representative size does not exceed the predetermined value, the lower limit value Ymin is corrected to be smaller.
(Case of Rendering Command)

Though the image information of processing object is the bit map image in the above explanation, it will be appreciated that the image information may be rendered by a rendering command such as PostScript (registered trademark) or PDF (Portable Document Format). If the image information is specified by the rendering command, the control part 11 of the image display device 1 according to this embodiment acquires the size of each character based on the rendering command.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image processing device comprising:
an acceptance unit that accepts image information including a plurality of character image elements as a processing object;
a detection unit that detects a size of a character in each of the character image elements included in the accepted image information;
an extraction unit that extracts at least one part of the accepted image information, including a first character image element and a second character image element, as a display object image;
a decision unit that decides a first enlargement/reduction ratio $S_1$ using a size of a character included in the first character image element $X_1$, and that decides a second enlargement/reduction ratio $S_2$ using a size of a character included in the second character image element $X_2$, the second enlargement/reduction ratio $S_2$ being different from the first enlargement/reduction ratio $S_1$; and
a display control unit that controls the extracted display object image to include the first character image element enlarged or reduced at the first enlargement/reduction ratio $S_1$ and the second character image element enlarged or reduced at the second enlargement/reduction ratio $S_2$.

2. The image processing device as claimed in claim 1, further comprising a calculating unit that calculates a scale ratio β using a size range defined by an upper limit target value $Y_{MAX}$ and a lower limit target value $Y_{MIN}$ of character sizes determined for the extracted display object image,
wherein the decision unit decides the first enlargement/reduction ratio $S_1$ and the second enlargement/reduction ratio $S_2$ using the scale ratio β.

3. The image processing device as claimed in claim 2, wherein the decision unit changes the size range by correcting the lower limit target value $Y_{MIN}$ to a larger value, upon receiving an instruction of an enlarged display.

4. The image processing device as claimed in claim 2, wherein the decision unit changes the size range by deciding either the upper limit target value $Y_{MAX}$ or the lower limit target value $Y_{MIN}$ as a correction object using a size of a character included in the extracted display object image, and
wherein the decision unit changes the upper limit target value $Y_{MAX}$ or the lower limit target value $Y_{MIN}$ decided as the correction object, upon receiving an instruction of changing either the first enlargement/reduction ratio $S_1$ or the second enlargement/reduction ratio $S_2$.

5. The image processing device as claimed in claim 2, wherein the decision unit calculates a mode of the size of the character detected by the detection unit, and decides the first enlargement/reduction ratio $S_1$ and the second enlargement/reduction ratio $S_2$ so that the mode may be a predetermined normal value included in the size range.

6. The image processing device as claimed in claim 2, wherein the calculating unit calculates the scale ratio β using a maximum value $X_{MAX}$ and a minimum value $X_{MIN}$ of character sizes detected by the detection unit in the character image elements.

7. The image processing device as claimed in claim 6, wherein β is calculated by using $\beta=(Y_{MAX}-Y_{MIN})/(X_{MAX}-X_{MIN})$.

8. The image processing device as claimed in claim 7, wherein $S_1$ is decided by using $S_1=(Y_{MIN}+(X_1-X_{MIN})\times\beta)/X_1$, and
wherein $S_2$ is decided using $S_2=(Y_{MIN}+(X_2-X_{MIN})\times\beta)/X_2$.

9. An image processing method comprising:
accepting image information including a plurality of character image elements as a processing object;
detecting a size of a character in each of the character image elements included in the accepted image information;
extracting at least one part of the accepted image information, including a first character image element and a second character image element, as a display object image;
deciding a first enlargement/reduction ratio $S_1$ using a size of a character included in the first character image element;
deciding a second enlargement/reduction ratio $S_2$ using a size of a character included in the second character image element $X_2$, the second enlargement/reduction ratio $S_2$ being different from the first enlargement/reduction ratio $S_1$; and
controlling the extracted display object image to include the first character image element enlarged or reduced at the first enlargement/reduction ratio $S_1$ and the second character image element enlarged or reduced at the second enlargement/reduction ratio $S_2$.

10. A non-transitory computer readable medium storing a program causing a computer to execute a process for performing image processing, the process comprising:
- accepting image information including a plurality of character image elements as a processing object;
- detecting a size of a character in each of the character image elements included in the accepted image information;
- extracting at least one part of the accepted image information, including a first character image element and a second character image element, as a display object image;
- deciding a first enlargement/reduction ratio $S_1$ using a size of a character included in the first character image element;
- deciding a second enlargement/reduction ratio $S_2$ using a size of a character included in the second character image element $X_2$, the second enlargement/reduction ratio $S_2$ being different from the first enlargement/reduction ratio $S_1$; and
- controlling the extracted display object image to include the first character image element enlarged or reduced at the first enlargement/reduction ratio $S_1$ and the second character image element enlarged or reduced at the second enlargement/reduction ratio $S_2$.

* * * * *